United States Patent [19]

Magder

[11] 4,318,996
[45] Mar. 9, 1982

[54] LIGHTWEIGHT CERAMIC COMPOSITION

[75] Inventor: Jules Magder, Princeton, N.J.

[73] Assignee: Princeton Organics Incorporated, Princeton, N.J.

[21] Appl. No.: 142,114

[22] Filed: Apr. 21, 1980

[51] Int. Cl.³ .................. C04B 21/00; C04B 21/02
[52] U.S. Cl. ................................. 501/84; 264/42
[58] Field of Search ............... 106/40 R; 264/42, 43; 501/84

[56] References Cited

U.S. PATENT DOCUMENTS

| | | | |
|---|---|---|---|
| 1,743,803 | 1/1930 | Arensberg et al. | 106/41 |
| 1,761,108 | 6/1930 | Desmarquest | 264/63 |
| 2,996,389 | 8/1961 | Fernhof | 106/41 |
| 3,310,614 | 3/1967 | Burkett et al. | 264/44 |
| 3,565,647 | 2/1971 | Magder | 106/86 |
| 3,700,470 | 10/1972 | Barton | 106/40 R |
| 3,729,328 | 4/1973 | Magder | 106/90 |
| 3,944,425 | 3/1976 | Magder | 106/40 R |
| 4,112,033 | 9/1978 | Lingl | 106/72 |

OTHER PUBLICATIONS

Norton, F. H.; Elements of Ceramics, 2nd Edition, Addison-Wesley Publication 10974, p. 105.
Foster, H. D., "Manufacture of Lightweight Products", Bulletin American Ceramic Society 19(12), pp. 468-473, (1940).
Nicholson, C. et al., "Cellulated Ceramics for the Structural Clay Products Industry" Journal American Ceramic Society, 36(4), pp. 127-136 (1953).

Primary Examiner—Edward J. Meros
Assistant Examiner—Mark Bell
Attorney, Agent, or Firm—Depaoli & O'Brien

[57] ABSTRACT

This invention provides a lightweight ceramic composition which is characterized by an average bulk density between about 10–105 PCF, and a compressive strength between about 300–10,000 psi.

In a preferred embodiment, this invention provides an extruded structural cellular clay product having pores which are substantially non-interconnected and elongated in a single directional configuration, and having a density gradient in at least one cross-sectional plane, in which gradient the higher density is in proximity to the outer surfaces.

15 Claims, 1 Drawing Figure

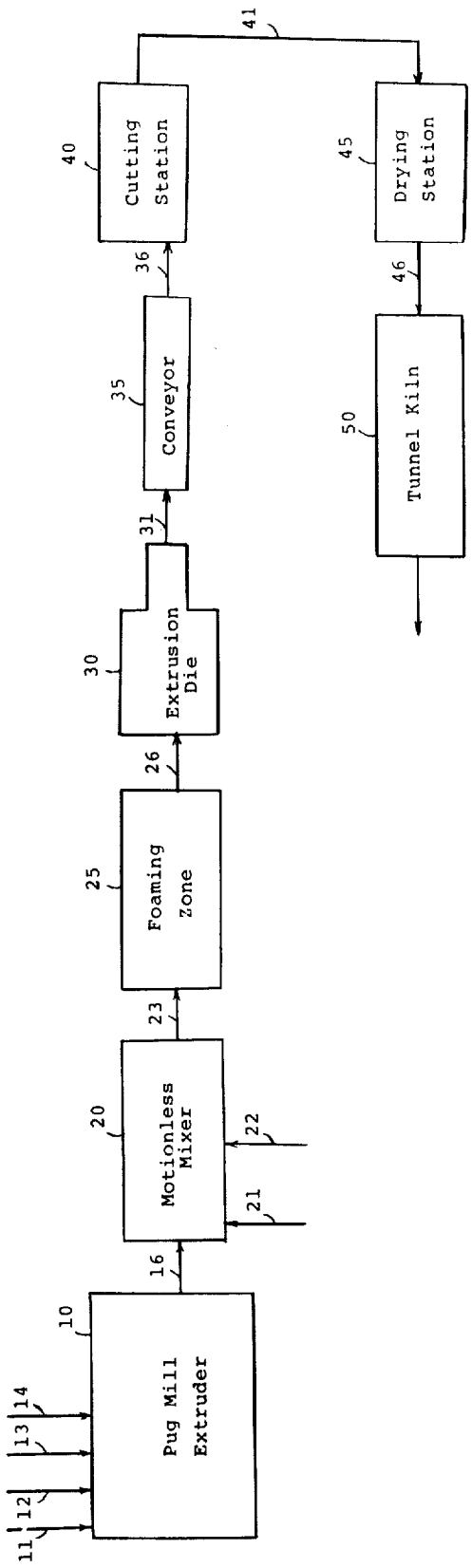

LIGHTWEIGHT CERAMIC COMPOSITION

BACKGROUND OF THE INVENTION

There is increasing interest in the development of strong lightweight ceramic products such as bricks and tiles.

Lightweight ceramic compositions which are strong and durable are in great demand for structural and semi-structural applications. Lightweight ceramics are desirable because of their dimensional stability, insulating properties, and inertness to corrosive and abrasive environments.

Ceramics are made in lightweight form by a variety of processes which commonly comprise one of the following steps as the means of inducing porosity:

1. the burnout method which involves the incorporation of combustible or volatilizable particles in a mixture of ceramic raw materials prior to firing;
2. firebloating a ceramic material to release a gas such as steam or an oxide of carbon or sulfur.
3. bonding lightweight inorganic particles with a relatively dense cementitious matrix, such as clay- or silica-bonded bubble alumina; or
4. dispersing or dissolving ceramic raw materials in a liquid, foaming the liquid, and then drying and firing the foam. In this method a preformed froth may be mixed with the dispersion or solution, or a compressed or condensed gas may be incorporated into the dispersion or solution and allowed to expand; or finally a gas may be generated in the liquid medium by a chemical reaction.

An example of a burnout process in the manufacture of insulating firebrick from a mixture of clay, sawdust, and gypsum. Firebloating processes are used to manufacture lightweight clay masonry or insulation units, foamed glass, expanded perlite, and expanded shale aggregate.

Known lightweight clay articles prepared by foaming water dispersions of clays are described by H. D. Foster, "Manufacture of Lightweight Products", *Bull. Am. Ceram. Soc.*, 19 (12), 468-73 (1940) and by C. M. Nicholson and G. A. Bole, "Cellulated Ceramics for the Structural Clay Products Industry" *Jour. Am. Ceram. Soc.*, 36 (4), 127-36 (1953). Known dispersion-foaming processes for clays employ organic polymeric or surface active foam stabilizers, such as cellulose ethers or esters, glues, gums, hydrolyzed vegetable and animal proteins, amines containing large hydrocarbon radicals, soluble salts of sulfonated hydrocarbons, and the like. Such foams have the disadvantage of loss of induced porosity and progressive shrinkage during drying and/or firing, resulting in inability to control density under commercial manufacturing conditions and often inability to achieve practical densities lower than 40 to 50 PCF (pounds per cubic foot).

Illustrative of prior art methods of manufacturing lightweight ceramic products, U.S. Pat. No. 1,761,108 describes a method for producing cellular building materials which involves the steps of admixing refractory clay with hydraulic cement and a gas generating powder such as aluminum powder; adding water to form a slip; casting the slip in molds; demolding and drying the formed blocks; and firing the blocks to vitrify the ingredients.

U.S. Pat. No. 3,310,614 described a method for producing extruded lightweight burned clay products having substantially uniformly distributed and regularly oriented flat flake-like voids. The method involves (1) mixing together 6-8 parts of clay or shale with 2-4 parts of seed hulls, (2) combining the admixture with 15-25 weight percent of water to form a stiff mud, (3) extruding the stiff mud into a columnar shape having the approximate cross-section of the desired clay product, (4) cutting the column shape into individual clay units, and (5) drying and firing the clay units to burn out the seed hull flakes and form a fired clay product having flat flake-like voids.

U.S. Pat. No. 3,700,470 describes a method for producing lightweight foamed solid shapes which involves (1) preparing an admixture of ceramic filler, sodium silicate, amphoteric metal powder and water, whereby the metal powder reacts with part of the sodium silicate to liberate hydrogen that expands the plastic mixture, (2) shaping the mixture, and (3) curing the shaped mixture by heating it at a temperature of at least 80° C.

A typical foamed ceramic composition has a relatively low strength after firing, and the volume firing shrinkage makes it difficult to control and reproduce density under practical commercial manufacturing conditions. Also, any commercial process for making lightweight ceramics by a burnout or firebloating method can be a hazardous source of carbonaceous or sulfur-containing pollutants.

U.S. Pat. No. 3,944,425 discloses a method for providing lightweight foamed clay shapes which overcomes many of the disadvantages of the prior art technology described above. The method involves mixing, foaming and firing a composition comprising 20-95 parts of clay, 4-35 parts of hydraulic cement, 0.2-30 parts of inert particulate lamellar foam stabilizer, 0-76 parts of inert filler, and 21-70 parts of water, wherein all of the foaming action occurs between cessation of the mixing and about 10 minutes thereafter. The said U.S. Pat. No. 3,944,425 method is particularly suitable for slip casting of shaped clay bodies, as distinct from a stiff mud extruding procedure.

As indicated by the prior art references described above, investigative effort to develop improved lightweight ceramic compositions is a continuing objective.

Accordingly, it is a main object of this invention to provide a lightweight ceramic composition which has exceptional strength and durability at a density below about 105 pounds per cubic foot.

It is a further object of this invention to provide a deformable cellular clay body which can be shaped and sized by extrusion into a self-supporting columnar matrix.

It is a further object of this invention to provide a method of manufacturing foamed structural clay products, for which method conventional extrusion brick-making equipment may be readily adapted.

It is a further object of this invention to provide a deformable cellular clay body which can be fired to a lightweight ceramic matrix without the evolution of noxious volatiles.

It is a further object of this invention to provide foamed structural clay products by a method which employs less than about 50 percent of the drying and firing energy requirements of conventional brick manufacturing methods.

It is another object of this invention to provide a structural cellular clay product which has pores which are substantially uniform and non-interconnected.

It is still another object of this invention to provide lightweight foamed structural clay products with at least one relatively dense, impervious and abrasion-resistant surface.

Other objects and advantages of the present invention shall become apparent from the accompanying description and example.

BRIEF DESCRIPTION OF THE DRAWING

The FIGURE shows a flow diagram of the invention process.

DESCRIPTION OF THE INVENTION

One or more objects of this invention are accomplished by the provision of a cellular clay body adapted for conversion into a fired lightweight ceramic composition, wherein said clay body is produced by a process which comprises (1) providing a deformable plastic mass having a viscosity of at least about 500 poises, by the uniform blending of an admixture comprising clay, water, gas generating agent, and foam stabilizing agent; (2) allowing between about 0.01–5 seconds for pore formation in the blended plastic mass; and (3) shaping and sizing the resultant lightweight plastic mass into a self-supporting matrix.

In another embodiment, this invention provides a cellular clay body adapted for conversion into a fired lightweight ceramic composition, wherein said clay body is produced by a process which comprises (1) providing a deformable plastic mass having a viscosity of at least about 500 poises, by the uniform blending of an admixture comprising clay, water, setting agent, gas generating agent, and foam stabilizing agent; (2) allowing between about 0.01–5 seconds for pore formation in the blended mass; and (3) shaping and sizing the resultant lightweight plastic mass into a self-supporting matrix.

An important object of the present invention is accomplished by the further provision of a structural cellular clay product characterized by an average bulk density between about 10–105 PCF, a compressive strength between about 300–10,000 psi, and pores which are substantially smooth-walled and elongated in a single directional configuration and which are substantially non-interconnected. In a preferred embodiment, the said structural cellular clay product is further characterized by a density gradient in at least one cross-sectional plane, in which gradient the higher density is in proximity to the outer surfaces. Such products are eminently useful for general wall construction, particularly in exterior applications in both load bearing and non-load bearing design.

By the term "substantially" as employed herein with respect to the pore structure is meant more than about 50 percent of the said individual pores.

The order of addition of the ingredients to the admixture may be varied, and the preferred order depends mainly on the specific equipment employed for blending and the particular gas generating agent which is present. After the gas generating agent, (and setting agent if used) have been introduced into a mixing zone, the blending preferably is performed as rapidly as possible (e.g., 0.1–2 seconds), then about 0.01–5 seconds are allowed for pore formation in the blended plastic mass.

The resultant cellular clay body is shaped into a self-supporting matrix. In a highly preferred embodiment, the said cellular clay body is shaped into a self-supporting columnar matrix by a continuous extrusion procedure, and subdivided into individual units of desired length, similar to the manufacture of conventional extruded dense clay bricks.

The components in the admixture are normally employed on a weight basis comprising about 100 parts of clay, 8–75 parts of water, 0.2–30 parts of foam stabilizing agent, and a sufficient quantity of a gas generating agent to provide porosity.

The components in a typical admixture will comprise about 100 parts of clay, 8–75 parts of water, 0.5–35 parts of setting agent, 0–200 parts of particulate non-plastic ceramic material, 0.2–30 parts of inert particulate lamellar foam stabilizing agent, and a sufficient quantity of a gas generating agent to provide a cellular matrix which has a final bulk density between about 20–60 PCF when fired.

Clay Component

Suitable clays include kaolinite, illite, and montmorillonite types; fireclays, brick clays, flint clays, shale clays, slip clays, ball clays, kaolins, bentonites, and others. The term "clay" is intended to include conventionally designated clays, shales, and mixtures thereof. A natural clay may adventitiously contain a non-colloidal particulate lamellar material as defined below. Such a lamellar material may occur as an impurity in the clay, such as talc, mica, or pyrophyllite; or else the lamellar material may consist of a non-colloidal clay fraction such as delaminated kaolinite platelets with diameters greater than about 1 to 2 microns and diameter-to-thickness ratios greater than about 5:1. A clay which naturally contains the appropriate minor fraction of such a lamellar material is found to perform the function both of the clay component and the lamellar material.

For purposes of the present invention the clay must have plasticity. Although the term "plasticity" does not have a mathematical definition or a method of measurement which is generally accepted by ceramic technologists, "plastic clay" is a universally used term of art and its qualitative meaning is intended for the purpose of describing the present invention. Illustrative of the state of the art is an article by V. J. Owen and W. E. Worrall which describes an extrusion method for the testing of the flow properties of plastic clays, published in Trans. Brit. Ceram. Soc., 59[8], 285–302 (1960).

Plasticity means that property of a clay-water mixture which requires that a certain finite stress may be applied before any deformation of the clay occurs; and conversely, when the stress is removed the clay retains whatever deformation it has undergone. The minimum stress for a specific deformation is the clay's "yield value".

For purposes of the present invention, the clay body must be sufficiently plastic so as to permit the formation of a coherent self-supporting mass which does not undergo spontaneous deformation under its own weight.

It is preferred that the clay component be at least partially deflocculable since deflocculation of the clay during the foaming stage promotes the retention of gas bubbles and the formation of rounded non-interconnected pores which result in improved thermal insulation, mechanical, and weathering characteristics of the fired product. Also, deflocculation reduces the total amount of water which must be added to achieve the desired working consistency. Low water content increases the green strength of the foam for handling purposes, reduces the tendency to crack during drying, and reduces drying time and drying fuel cost.

Clays or shales are deflocculated by chemical and/or mechanical action. Chemical deflocculants are well known and include soluble silicates, carbonates, citrates, polyphosphates, alginates, polyelectrolytes, and the like. Such chemicals may be added as a separate component, or proportioned with the raw clay feed. Some clays contain naturally occurring deflocculants, so that no specific addition of deflocculant is necessary.

Deflocculation of a clay-water mixture reduces its yield value. In the present invention the clay should not be excessively deflocculated; rather, only sufficiently that the yield value is still high enough to permit the formation of a coherent self-supporting foamed clay mass.

Gas Generating Agent

A gas generating agent is selected which provides the generation of uniform pores at a controlled rate in the blended plastic clay mass.

Suitable gas generating agents include hydrogen peroxide in combination with a catalyst for its decomposition to oxygen and water; a gas which is soluble in the clay-water mixture under pressure (e.g., carbon dioxide); a carbonate (e.g., magnesium carbonate) in combination with an acidic compound (e.g., aluminum sulfate); a nitrite (e.g., calcium nitrite) in combination with an ammonium salt (e.g., ammonium sulfate) to release nitrogen; a metal such as aluminum or zinc which releases hydrogen in combination with an alkali; a compound which releases nitrogen under the action of an alkali or heat (e.g., a nitrososubstituted amide or imide); and the like.

For purposes of the present invention, optimal results can be achieved with hydrogen peroxide in combination with a decomposition catalyst (e.g., manganese dioxide, copper oxide or catalase) as the gas generating agent. The said gas generating agent provides an excellent structure of uniform noninterconnected pores in the present invention lightweight ceramic compositions.

Foam Stabilizing Agent

An important aspect of the present invention compositions is the incorporation of a foam stabilizing agent as a component of the admixture during the blending phase. It is highly preferred that the foam stabilizing agent is an inert noncolloidal particulate lamellar material, of the type disclosed in U.S. Pat. Nos. 3,565,647; 3,729,328; and 3,944,425.

The average diameter of the particulate foam stabilizing agent is generally less than about 1 millimeter and the ratio of the average particle diameter to its average thickness is greater than about 5:1. Examples of such lamellar materials are platey talc, mica, graphite, pulverized exfoliated vermiculite, pyrophyllite, and metal flakes such as flakes of aluminum, bronze and the like.

The various lamellar materials differ in foam stabilizing efficiency. Quantities used in the present formulations can vary between about 0.2 and 30 parts, depending mainly on the specific lamellar material employed and the desired pore size of the foam structure. Higher levels of the lamellar foam stabilizer generally yield smaller pores. The lamellar foam stabilizers preferred in the present invention include talc, pyrophyllite, graphite, and the like.

The foam stabilizing agent can be added to the blending operation as an individual component, or it can be proportioned as part of the raw clay feed.

Setting Agent

A cellular clay body of the present invention usually is sufficiently plastic to provide a self-supporting matrix after foaming and shaping are completed. Optionally, a setting agent component may be included in the precursor plastic clay admixture, in a quantity up to about 35 parts by weight per 100 parts by weight of clay.

A setting agent accelerates the setting action of a plastic admixture by either (1) causing flocculation of the clay-water suspension (e.g., by reversing the action of a deflocculant); (2) functioning as an internal drying agent by reacting with or tying up at least part of the water of fluidity; or (3) forming a three-dimensional matrix, such as by gelation or polymerization.

One type of flocculant setting agents are compounds which produce polyvalent ions when they dissolve in or react with water, e.g., soluble salts of calcium, magnesium, aluminum, zinc, titanium, zirconium, barium, iron, and the like.

Another type of flocculant setting agents are compounds which react with water or other compounds in the cellular clay body to produce strong acids, e.g., inorganic esters, such as dimethyl sulfate or t-butyl chloride which hydrolyze to sulfuric acid and hydrochloric acid, respectively; thiourea, which reacts with hydrogen peroxide to yield sulfuric acid; titanium tetrachloride, which hydrolyzes to hydrochloride acid; and the like.

Another type of flocculant setting agents are compounds which react with specific deflocculants, e.g., acetic anhydride or sodium aluminate, which react with sodium silicate deflocculant; zinc chloride, which reacts with tetrasodium diphosphate deflocculant; and the like.

Illustrative of internal drying agents which function as setting agents are hydraulic cements such as portland cement, calcined gypsum and calcium aluminate cement.

Other internal drying agents which function as setting agents are organic gel-formers such as methylcellulose, carboxycellulose, polyacrylamide, polyacrylate, polyvinyl alcohol, agar, gelatin, and the like; and inorganic gel-formers such as bentonite, magnesium silicate gel, and the like.

As indicated previously, if the clay component has suitable rheological properties (i.e., a high yield value), it is not necessary to employ a setting agent in the lightweight plastic mass. Some clay-water mixtures are fluid under shear or vibration, but have high yield values when allowed to relax undisturbed. Such thixotropic foamed plastic bodies are selfsupporting, and have sufficient green strength to be cut and handled.

Other optional components may be included in the formulations, such as up to about 200 parts of particulate non-plastic ceramic material per 100 parts of clay component. Illustrative of such materials are aluminas including alpha aluminas, tabular aluminas, hydrous aluminas and high surface area aluminas; silicas; zircon; zirconia; limestone; dolomite; talc; olivine; pyrophyllite; kyanite; mullite; raw and calcined bauxite; feldspar; syenite; wollastonite; grog; trap rock; fly ash; particulate glass; metakaolinites; zeolites; and the like.

For purposes of the present invention, it is advantageous to employ particulate components which have a small particle size, e.g., all of the particulate material in a formulation preferably should have a particle size finer than about 60 standard U.S. mesh. Fine particle size favors low pore connectivity.

Processing Means

The present invention technology is adapted for integration into a modern brick manufacturing operation which employs a continuous extrusion process, such as that illustrated in U.S. Pat. No. 3,310,614 and U.S. Pat. No. 4,112,033.

A typical pug mill-extruder has a mixing section connected to one end of an extrusion barrel. An auger is positioned along the bottom of the mixing section and passes into the extrusion barrel. A die is attached to the other end of the extrusion barrel. The extrusion barrel and die are watercooled to reduce friction wear.

The said conventional pug mill-extruder is modified for purposes of the present invention. A motionless mixer is fitted at the end of the extrusion barrel. The motionless mixer is a pipe containing a series of flow-dividing elements, each of which splits the stream into two or more parts and recombines the stream so as to provide predictable mixing efficiency with low pressure drop. Commercial motionless mixers are sold under tradenames such as Kenics; Ross; and Komax.

In practice, the raw clay, water, foam stabilizing agent and any optional components are proportioned into the pug mill. The foam stabilizing agent may be metered using a volumetric or gravimeter feeder. Water is proportioned at a level that provides the desired workability in the pug mill.

The gas generating agent is injected into the clay-water dispersion stream near the upstream end of the motionless mixer, employing a positive displacement metering pump with sufficient pressure capability to overcome the back pressure of the clay-water dispersion. If the gas generating agent is the preferred hydrogen peroxide, then the decomposition catalyst (e.g., manganese dioxide) is charged to the pug mill with the other components.

If a setting agent is employed, it is introduced into the motionless mixer at a point downstream from the hydrogen peroxide inlet location as illustrated in the drawing.

A suitable metering pump for hydrogen peroxide is a piston-diaphragm pump, such as a Lapp Pulsafeeder, fitted with a pulsation-dampening device. The setting agent (e.g., a portland cement slurry in mineral oil) may be pumped with a progressing cavity pump, such as a Moyno pump.

The discharge end of the motionless mixer is connected to an empty tube section in which most of the foaming takes place. The tube discharges through an extrusion die onto a conveyor, where the extrudate completes foaming, sets and is sized by passing through compression rollers; and then, optionally, is textured or surface decorated, and cut to brick size units with a wire cutter. The foamed bricks are then dried and fired according to conventional brick making art.

The pressure in the extruder nominally will be at a level of about 100–200 psi. The green bricks can be dried in a tunnel dryer for about 24 hours at a temperature of about 250°–450° F. The dried bricks, having a residual water content below about 5 weight percent, can be fired in a tunnel kiln for about 20 hours usually at a temperature of about 1700°–2300° F.

The surface treatment of the raw bricks before firing can include the application of a glaze coating (e.g., an average glaze thickness of about 0.02 inches). As described in U.S. Pat. No. 3,689,611, standard commercial spray lines, having spray guns for applying the water-dispersed solid compositions, can be utilized for both engobe and glaze treatments.

Ceramic Properties

Production of an invention structural cellular clay product by means of a continuous extrusion technique can contribute unique ceramic properties to the clay product.

The lightweight plastic clay mass from the blending operation passes through the extruder die with a laminar type of flow. If an extrusion lubricant is not used, the velocity is at maximum at the center of the die and decreases to nearly zero at the die walls.

The laminar flow has several important effects on the plastic clay mass. First, the pores tend to become elongated in a single directional configuration parallel to the flow. Second, the pores become oriented in a uniform pattern of size and shape. Third, a density gradient in at least one cross-sectional plane is introduced into the plastic clay mass before it sets into a rigid matrix. The higher density is in proximity to the outer surfaces.

Hence, the resultant structural cellular clay product exhibits an exceptional strength-to-density ratio, high resistance to loss of porosity during drying and firing, and high abrasion resistance. Further, a present invention structural cellular clay product is characterized by high resistance to water absorption (as measured by an ASTM C-62 five-hour boil absorption test) in comparison to prior art foamed structural clays.

The porosity in the structural cellular clay product is substantially non-interconnected. The individual pores are substantially uniform in size, and have a diameter (i.e., the length of a line passing through the center along any axis) in the range between about 1000–3000 microns.

As indicated previously, the present invention is suitable for providing a fired cellular clay product which is characterized by an average bulk density between about 10–105 PCF, and a compressive strength between about 300–10,000 psi.

The following Example is further illustrative of the present invention. The specific ingredients are presented as being typical, and various modifications can be derived in view of the foregoing disclosure within the scope of the invention.

EXAMPLE

This Example illustrates a present invention brick producing system operating on a continuous basis and is better understood by reference to the drawing which is represented as a flow diagram of a modified pug mill-extruder production line.

The brick producing system is operated at a rate which yields about 4000 brick equivalents per hour. A "brick equivalent" refers to a fired brick which is 8×2-¼×3-¾ inches in dimensions.

The nominal feed rate for each of the formulation components is as follows:

|  | Parts By Weight | Pounds per hour, Feed Rate |
| --- | --- | --- |
| Ground raw clay | 112.0 (12 parts water) | 10,080 |
| Platey talc | 2.5 | 225 |
| Water | 8.0 | 720 |

-continued

|  | Parts By Weight | Pounds per hour, Feed Rate |
|---|---|---|
| Sodium silicate (type N) | 0.5 | 45 |
| Manganese sulfate (5% aq. sol.) | 2.0 | 180 |
| Hydrogen peroxide (35%) | 0.6 | 54 |
| Portland cement slurry in mineral oil (65%) | 3.08 | 227 |
| Fired weight | 100.0 | 9000 |

Referring to the flow diagram of the drawing, the raw clay and water components are fed into Pug Mill-Extruder unit 10 through line 11. Simultaneously, there is fed into Pug Mill-Extruder unit 10 the sodium silicate deflocculant (line 12), the manganese sulfate gas generating catalyst (line 13), and the platey talc foam stabilizing agent (line 14).

The worked mixture extrudes continuously through connecting link 16 into Motionless Mixer unit 20. At the same time, the portland cement setting agent (line 22) and the hydrogen peroxide gas generating agent (line 21) are fed continuously into Motionless Mixer unit 20. The combined mixture is homogenized in Motionless Mixer unit 20 for a period of about 1.5 seconds to form a plastic mass.

The said plastic mass transfers continuously through connecting link 23 into Foaming Zone unit 25. The length of Foaming Zone unit 25 is such that it allows a foaming time of about 3 seconds.

The resultant cellular plastic mass is delivered to Extrusion Die unit 30 through connecting link 26. The shaped and sized extrudate mass passes via transfer means 31 onto Conveyor unit 35. The length and speed of Conveyor unit 35 is such that the extrudate mass is conveyed for a period of about 25 seconds.

Conveyor unit 35 delivers the extrudate mass via transfer means 36 to Cutting Station unit 40, where the extrudate mass is subdivided into brick-sized billets.

The bricks are delivered via means 41 to Drying Station unit 45, where the bricks are dried in circulating air at a temperature of about 140° F. After drying, the bricks are transferred via means 46 to Tunnel Kiln unit 50. The bricks are fired at 2100° F. for 10 hours.

The bricks so produced have a nominal bulk density of 55 PCF and a compressive strength of about 3000 psi.

What is claimed is:

1. A cellular clay body adapted for conversion into a fired lightweight ceramic composition, wherein said clay body is produced by a process which comprises (1) providing a deformable plastic mass having a viscosity of at least about 500 poises, by the uniform blending of an admixture comprising clay, water, gas generating agent, and foam stabilizing agent; (2) allowing between about 0.01-5 seconds for pore formation in the blended plastic mass; and (3) shaping and sizing the resultant lightweight plastic mass by extrusion into a self-supporting matrix; wherein the admixture in process step (1) on a weight basis comprises about 100 parts of clay, 8-75 parts of water, 0.2-30 parts of foam stabilizing agent, and a sufficient quantity of a gas generating agent to provide porosity.

2. A cellular clay body in accordance with claim 1 wherein the uniform blending is accomplished at least in part by means of a motionless mixer.

3. A cellular clay body in accordance with claim 1 wherein the gas generating agent is hydrogen peroxide in combination with a decomposition catalyst.

4. A cellular clay body in accordance with claim 1 wherein at least part of the foam stabilizing agent is inert particulate lamellar material which occurs adventitiously in the clay component.

5. A cellular clay body in accordance with claim 1 wherein the foam stabilizing agent is lamellar talc.

6. A lightweight ceramic composition produced by firing the cellular clay body of claim 1.

7. A cellular clay body adapted for conversion into a fired lightweight ceramic composition, wherein said clay body is produced by a process which comprises (1) providing a deformable plastic mass having a viscosity of at least about 500 poises, by the uniform blending of an admixture comprising clay, water, setting agent, gas generating agent, and foam stabilizing agent; (2) allowing about 0.01-5 seconds for pore formation in the blended plastic mass; and (3) shaping and sizing the resultant lightweight plastic mass by extrusion into a self-supporting matrix; wherein the admixture in process step (1) on a weight basis comprises about 100 parts of clay, 8-75 parts of water, 0.5-35 parts of a setting agent, 0-200 parts of particulate non-plastic ceramic material, 0.2-30 parts of inert particulate lamellar foam stabilizing agent, and a sufficient quantity of a gas generating agent to provide porosity.

8. A cellular clay body in accordance with claim 7 wherein the setting agent is hydraulic cement.

9. A cellular clay body in accordance with claim 7 wherein the setting agent is portland cement.

10. A lightweight ceramic composition produced by firing the cellular clay body of claim 7.

11. A fired structural foamed cellular clay product characterized by (1) an average bulk density between about 10-105 pounds per cubic foot; (2) a compressive strength between about 300-10,000 psi; and (3) pores which are substantially smooth-walled and elongated in a single directional configuration and substantially non-interconnected.

12. A structural cellular clay product in accordance with claim 11 wherein at least one surface is relatively impervious and abrasion-resistant.

13. A fired structural foamed cellular clay product characterized by (1) an average bulk density between about 10-105 pounds per cubic foot; (2) a compressive strength between about 300-10,000 psi; (3) pores which are substantially smooth-walled and elongated in a single directional configuration; and (4) a density gradient in at least one cross-sectional plane, in which gradient the higher density is in proximity to the outer surfaces; and wherein the pores in the cellular clay product are substantially non-interconnected.

14. A process for producing a cellular clay body adapted for conversion into a fired lightweight ceramic composition which process comprises (1) providing a deformable plastic mass having a viscosity of at least about 500 poises, by the uniform blending of an admixture comprising clay, water, gas generating agent, and foam stabilizing agent; (2) allowing between about 0.01-5 seconds for pore formation in the blended plastic mass; and (3) shaping and sizing the resultaant lightweight plastic mass into a self-supporting matrix by extrusion; wherein the admixture in process step (1) on a weight basis comprises about 100 parts of clay, 8-75 parts of water, 0.2-30 parts of foam stabilizing agent, and a sufficient quantity of a gas generating agent to provide porosity.

15. A process in accordance with claim 14 wherein the uniform blending is accomplished at least in part by means of a motionless mixer.

* * * * *